(12) United States Patent
Simon et al.

(10) Patent No.: US 8,955,471 B2
(45) Date of Patent: Feb. 17, 2015

(54) MECHANICAL COOLANT PUMP

(75) Inventors: Gilles Simon, Montois la Montage (FR); Arnaud Fournier, Yutz (FR)

(73) Assignee: Pierburg Pump Technology GmbH, Neuss (DE)

( * ) Notice: Subject to any disclaimer, the term of this patent is extended or adjusted under 35 U.S.C. 154(b) by 386 days.

(21) Appl. No.: 13/496,242

(22) PCT Filed: Aug. 24, 2010

(86) PCT No.: PCT/EP2010/062336
§ 371 (c)(1),
(2), (4) Date: Apr. 23, 2012

(87) PCT Pub. No.: WO2011/032808
PCT Pub. Date: Mar. 24, 2011

(65) Prior Publication Data
US 2012/0192816 A1 Aug. 2, 2012

(30) Foreign Application Priority Data
Sep. 16, 2009 (EP) .................................. 09170425

(51) Int. Cl.
*F01P 7/14* (2006.01)
*F01P 5/10* (2006.01)
*F04D 15/00* (2006.01)
*F16K 3/02* (2006.01)
*F01P 11/04* (2006.01)

(52) U.S. Cl.
CPC ............... *F01P 5/10* (2013.01); *F04D 15/0022* (2013.01); *F16K 3/0281* (2013.01); *F01P 11/04* (2013.01); *F01P 2007/146* (2013.01)
USPC .................................... 123/41.08; 123/41.44

(58) Field of Classification Search
USPC ........................................... 123/41.08, 41.44
See application file for complete search history.

(56) References Cited

U.S. PATENT DOCUMENTS

| 4,479,670 | A |  | 10/1984 | Gabler |
| 5,551,384 | A | * | 9/1996 | Hollis ..................... 123/142.5 R |
| 5,794,575 | A |  | 8/1998 | Sonnemann et al. |

FOREIGN PATENT DOCUMENTS

| CN | 101235907 A | 8/2008 |
| DE | 40 33 261 A1 | 4/1992 |
| DE | 195 40 591 A1 | 5/1997 |
| EP | 1 312 803 A2 | 5/2003 |
| EP | 1 950 387 A1 | 7/2008 |
| JP | 1-91031 U | 6/1989 |
| JP | 5 086970 A | 4/1993 |
| JP | 2001030740 A | 2/2001 |
| WO | WO 03/036145 A1 | 5/2003 |

* cited by examiner

Primary Examiner — Noah Kamen
(74) Attorney, Agent, or Firm — Norman B. Thot

(57) ABSTRACT

A mechanical coolant pump for an internal combustion engine includes an outlet channel comprising an outlet valve and an outlet channel wall with a passing slit. An impeller is configured to pump a coolant into the outlet channel. The outlet valve comprises a shiftable flat valve plate configured to be shiftable in a transversal plane of the outlet channel through the passing slit of the outlet channel wall.

7 Claims, 4 Drawing Sheets

MECHANICAL COOLANT PUMP

CROSS REFERENCE TO PRIOR APPLICATIONS

This application is a U.S. National Phase application under 35 U.S.C. §371 of International Application No. PCT/EP2010/062336, filed on Aug. 24, 2010 and which claims benefit to European Patent Application No. 09170425.4, filed on Sep. 16, 2009. The International Application was published in English on Mar. 24, 2011 as WO 2011/032808 A1 under PCT Article 21(2).

FIELD

The present invention provides a mechanical coolant pump for an internal combustion engine with an impeller for pumping the coolant into an outlet channel, wherein the outlet channel comprises an outlet valve.

BACKGROUND

A mechanical coolant is a coolant pump which is driven by the combustion engine, for example, by using a driving belt driving a driving wheel of the pump. As long as the combustion engine is cold, only a minimum coolant flow is needed. Mechanical coolant pumps are therefore used which are provided with an outlet valve for controlling the coolant circulation flow. As long as the combustion engine is cold, the outlet valve is closed so that the circulation of the lubricant is minimized, with the result that the combustion engine warming-up period is decreased.

Usually, outlet valves are used in the form of a pivoting flap, whereby the pivoting flap is positioned in the lubricant outlet channel. The pivoting flap can be controlled to rotate the flap into an open or closed position, whereby the positions determine the coolant circulation flow. The arrangement of such a pivoting flap inside the lubricant outlet channel, however, restrains the coolant flow even at the open position of the flap and induces a flow resistance. Such pivoting flaps can furthermore jam as a result of abrasion, distortion and particles in the lubricant which adhere at the flap and the recess for the flap.

SUMMARY

An aspect of the present invention is to provide a mechanical coolant pump with an improved outlet valve.

In an embodiment, the present invention provides a mechanical coolant pump for an internal combustion engine which includes an outlet channel comprising an outlet valve and an outlet channel wall with a passing slit. An impeller is configured to pump a coolant into the outlet channel. The outlet valve comprises a shiftable flat valve plate configured to be shiftable in a transversal plane of the outlet channel through the passing slit of the outlet channel wall.

BRIEF DESCRIPTION OF THE DRAWINGS

The present invention is described in greater detail below on the basis of embodiments and of the drawings in which.

DETAILED DESCRIPTION

Figure 1:
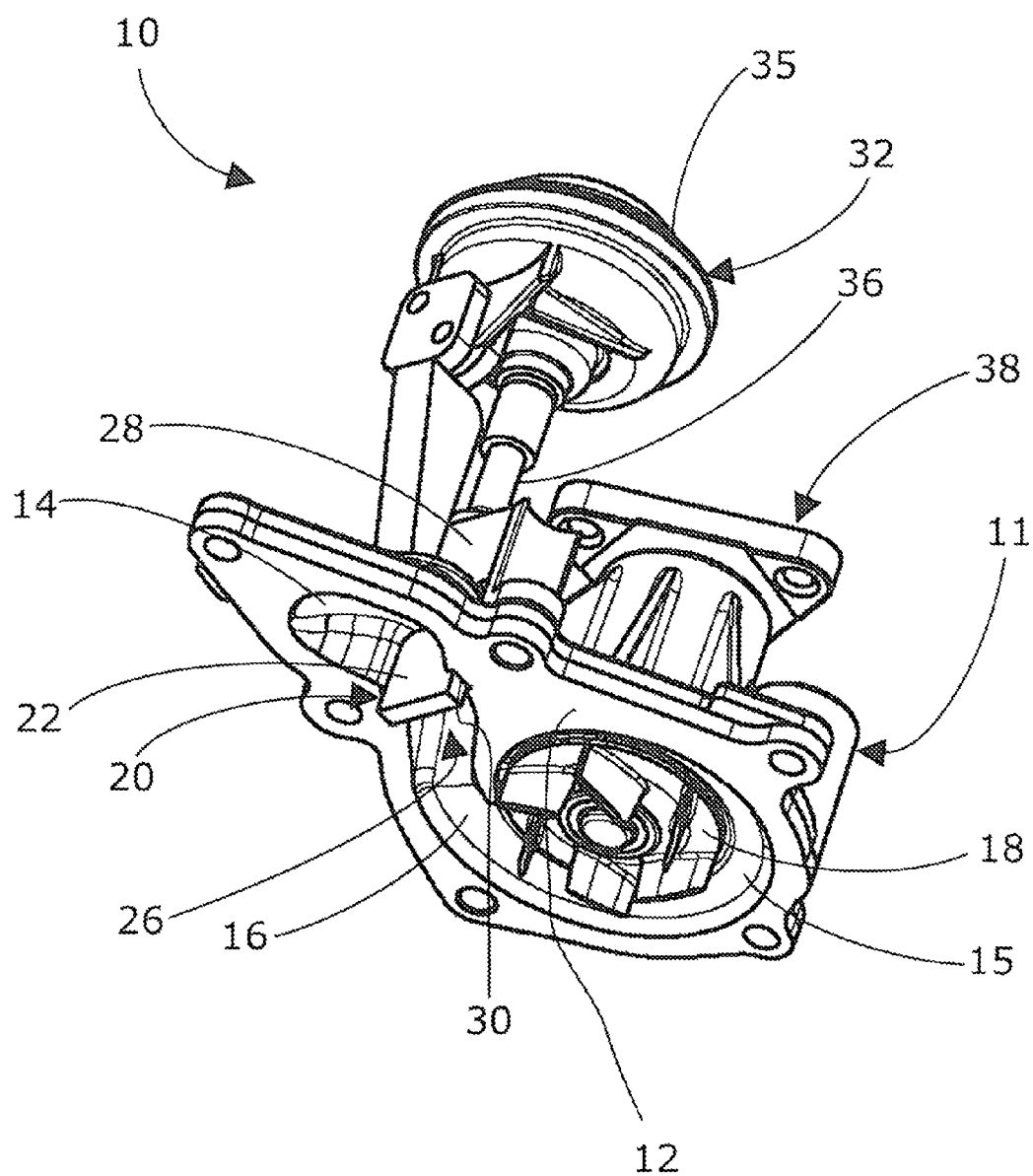
FIG. 1 shows a perspective view of the mechanical coolant pump.

The mechanical coolant pump for an internal combustion engine comprises an impeller for pumping the coolant into an outlet channel which comprises an outlet valve. The outlet valve comprises a shiftable flat valve plate which is shiftable in a transversal plane of the outlet channel through a passing slit in the outlet channel wall.

A shiftable flat valve plate in the outlet channel enables the control of the coolant flow to the combustion engine in order to bring the optimum coolant volume during a cold start phase. A control of the coolant flow in the cold start phase of the combustion engine enables a quicker warming-up and therefore an improved energy-efficiency of the combustion engine. The shiftability of the valve plate in a transversal plane of the outlet channel through a passing slit in the outlet channel wall allows for the use of an actuator. An actuator has a relative low actuation force because the sliding friction between the plate and the plate guiding is low and a pressure of the coolant acting against the valve plate does not significantly effects the actuation force which is necessary to move the valve plate into the open or closed position. The coolant flow is therefore not restrained during the circulation of the coolant.

In an embodiment of the present invention, the valve plate can, for example, be positioned in a fluid-tight valve plate housing in the open position and the valve plate housing extends radially from the outlet channel. A fluid-tight valve plate housing keeps the valve plate always inside the lubricant space so that the passing slit does not need to be sealed.

In an embodiment of the present invention, the valve plate housing can, for example, be formed as a separate part of a main pump body. A separate installation of the valve plate housing to the main pump body improves the flexibility with respect to the form and material of the housing so that the valve plate housing can be made of a material different from the material of the pump main body.

Alternatively, the valve plate housing is an integrated part of the main pump body. This construction allows for faster and more cost-efficient production.

In an embodiment of the present invention, the main pump body can, for example, be provided with the passing slit for the shiftable flat valve plate.

In an embodiment of the present invention, the main pump body can, for example, be provided with guiding slits at the outlet channel for the shiftable flat valve plate, and the valve plate is guided in the guiding slits. The guiding slits provide additional support for the valve plate against the pressure of the coolant flow which impacts permanently on the valve plate in the not opened position and provides for transversal movability of the valve plate in the outlet channel.

In an embodiment of the present invention, the valve plate can, for example, be driven by an actuator.

In an embodiment of the present invention, the actuator can, for example, be directly connected to the valve plate housing, so that no gear or lever or other means are necessary to transform the actuator movement to the valve plate movement.

In an embodiment of the present invention, the valve plate can, for example, be driven by a pneumatic actuator. The valve plate can also be driven by other actuators, such as electrical or thermostatic actuators. The pneumatic energy can be tapped at different positions at the combustion engine so that the use of a pneumatic actuator is simple and cost-efficient.

In an embodiment of the present invention, the pneumatic actuator can, for example, be provided with a membrane and an actuator rod perpendicular to the membrane, whereby the actuator rod is directly connected to and axially in line with the valve plate, so that no gear, lever etc. is necessary.

In FIG. 1, a mechanical coolant pump 10 for an internal combustion engine is shown. The mechanical coolant pump 10 comprises a main pump body 11, whereby the main pump body is mounted directly to the engine block by a flange 12 or can have a cover plate which is not shown.

The pump main body 11 holds a rotatable impeller 18 which sucks the coolant axially and pumps the coolant radially outwardly into a volute 15. The impeller 18 is driven by the combustion engine by using a driving belt (not shown) which drives a driving wheel 38 of the mechanical coolant pump 10. The coolant flows as a result of centrifugal forces from the volute 15 into an outlet channel 16 and through an outlet valve 20 to an outlet opening 14. The outlet valve 20 is positioned at the terminal end of the outlet channel 16.

The outlet valve 20 comprises a shiftable flat valve plate 22 which is shiftable in a transversal plane of the outlet channel 16 through a passing slit 24 of an outlet channel wall 26. The valve plate 22 is in its open position positioned in a fluid-tight valve plate housing 28 which extends radially from the outlet channel 16 at the passing slit 24. The shiftable valve plate 22 is driven by a pneumatic actuator 32, whereby the valve plate 22 guides in guiding slits 30 and whereby the guiding slits 30 are provided in the channel wall 26.

The actuator 32 is provided with a pneumatic membrane 34 in a membrane housing 35 and an actuator rod 36 perpendicular to the membrane 34, whereby the actuator rod 36 is axially in line with the valve plate 22. The actuator 32 is directly connected to the valve plate housing 28. In the open position, the valve plate 22 is completely positioned inside the valve plate housing 28 so that the coolant flow is not restrained. As long as the combustion engine is cold, the outlet valve 20 can be completely or partially closed by the pneumatic actuator 32.

Figure 2:
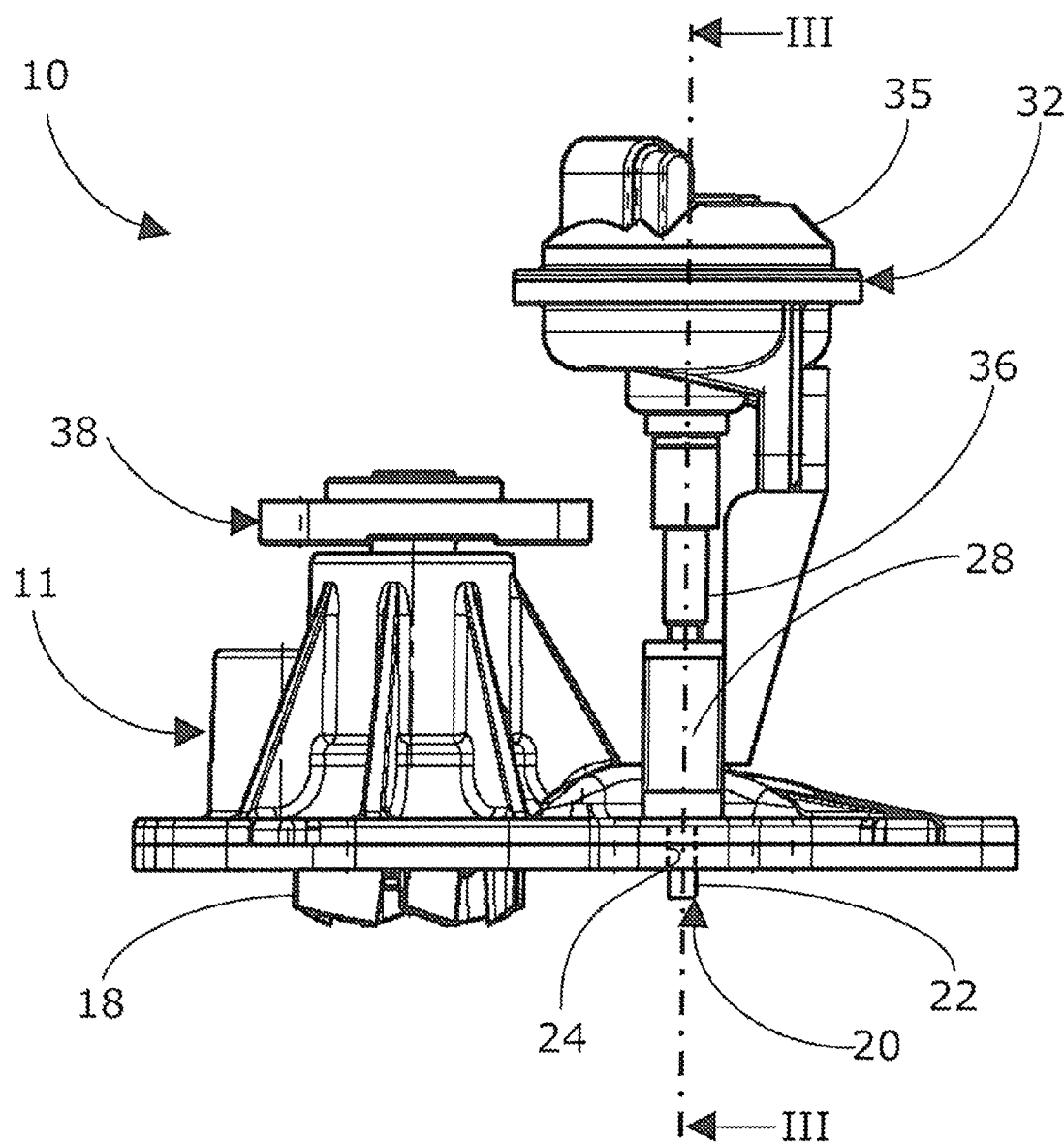
FIG. 2 shows a longitudinal section of the mechanical coolant pump.

In FIG. 2 a longitudinal section of the mechanical coolant pump 10 is shown. The mechanical coolant pump 10 comprises a pump main body 11. At the top of the pump main body 11 the valve plate housing 28 is positioned, whereby the valve plate housing 28 extends radially from the outlet channel 16 and perpendicular with respect to the flange 12 of the mechanical coolant pump 10.

Figure 3:
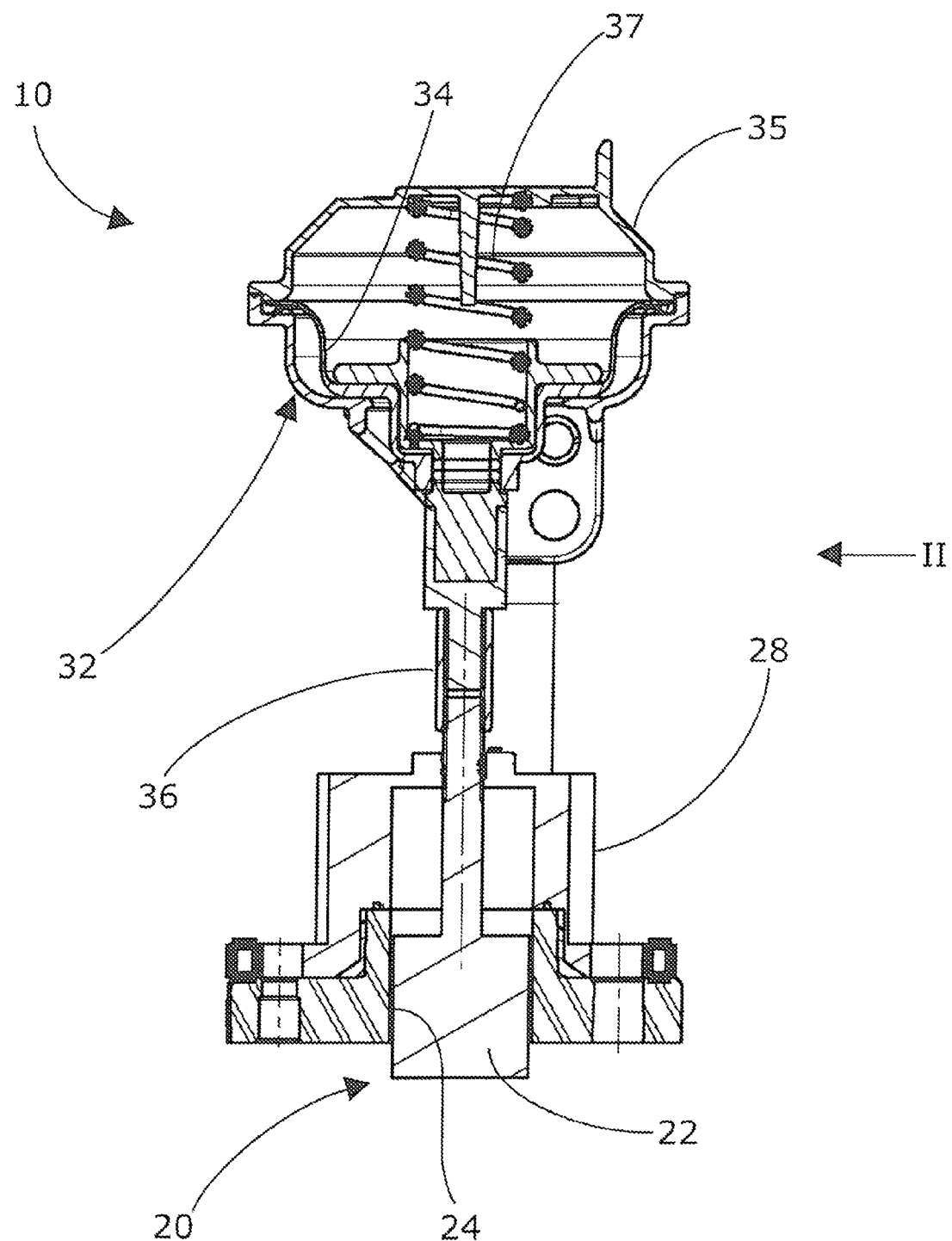
FIG. 3 shows the cross-section of the mechanical coolant pump of FIG. 2 along line III-III.
Figure 4:
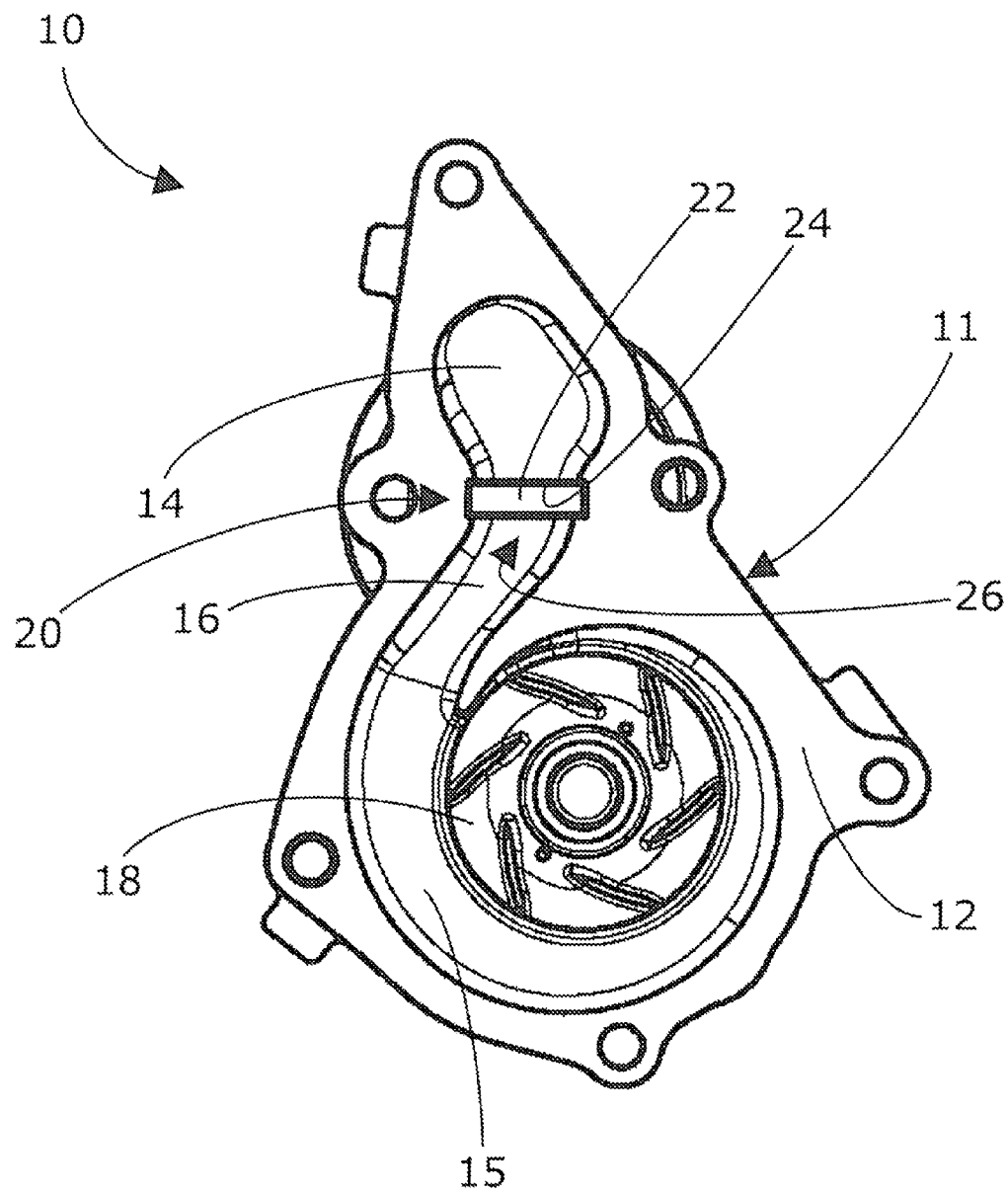
FIG. 4 shows a bottom view of the mechanical coolant pump.

In FIG. 3 a cross-section III-III of the mechanical coolant pump 10 of FIG. 2 is shown. The shiftable valve plate 22 is driven by the pneumatic actuator 32 via a pneumatic membrane 34 and an actuator rod 36. The actuator rod 36 is axially in line with the valve plate 22 and perpendicular to the membrane 34. The membrane 34 is preloaded by a preload spring 37 into the closed position of the outlet valve 20. Alternatively, the preload spring 37 can be arranged inversely to preload the outlet valve 20 in the open position so that the construction is failsafe.

The present invention is not limited to embodiments described herein; reference should be had to the appended claims.

What is claimed is:

1. A mechanical coolant pump for an internal combustion engine, the mechanical coolant pump comprising:
    an outlet channel comprising an outlet valve and an outlet channel wall with a passing slit;
    an impeller configured to pump a coolant into the outlet channel;
    a pneumatic actuator comprising a pneumatic membrane, the pneumatic actuator being configured to drive the shiftable flat valve plate; and
    an actuator rod, the actuator rod being arranged perpendicular to the pneumatic membrane and in line with the shiftable flat valve plate;
    wherein,
    the outlet valve comprises a shiftable flat valve plate configured to be shiftable in a transversal plane of the outlet channel through the passing slit of the outlet channel wall.

2. The mechanical coolant pump as recited in claim 1, further comprising a fluid-tight valve plate housing extending radially from the outlet channel, wherein the shiftable flat valve plate is disposed in the fluid-tight valve plate housing in an open position.

3. The mechanical coolant pump as recited in claim 2, further comprising a main pump body, wherein the fluid-tight valve plate housing is provided as a separate part of the main pump body.

4. The mechanical coolant pump as recited in claim 2, further comprising a main pump body, wherein the fluid-tight valve plate housing is provided as an integrated part of the main pump body.

5. The mechanical coolant pump as recited in claim 1, further comprising a main pump body, wherein the main pump body comprises the passing slit through which the shiftable flat valve plate is configured to shift.

6. The mechanical coolant pump as recited in claim 1, further comprising a main pump body comprising guiding slits for the shiftable flat valve plate, wherein the shiftable flat valve plate is configured to be guided in the guiding slits.

7. The mechanical coolant pump as recited in claim 1, wherein the pneumatic actuator is directly connected to the fluid-tight valve plate housing.

* * * * *